(12) United States Patent
Liu et al.

(10) Patent No.: US 10,399,126 B2
(45) Date of Patent: Sep. 3, 2019

(54) WHEEL CLEANING DEVICE

(71) Applicant: CITIC Dicastal CO., LTD, Qinhuangdao (CN)

(72) Inventors: Huiying Liu, Qinhuangdao (CN); Yao Zheng, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 175 days.

(21) Appl. No.: 15/803,009

(22) Filed: Nov. 3, 2017

(65) Prior Publication Data

US 2019/0022710 A1    Jan. 24, 2019

(30) Foreign Application Priority Data

Jul. 21, 2017   (CN) .................. 2017 1 0598294 6

(51) Int. Cl.
| | |
|---|---|
| *B08B 3/02* | (2006.01) |
| *B60S 3/04* | (2006.01) |
| *B05C 13/02* | (2006.01) |
| *B05C 11/10* | (2006.01) |
| *B05C 7/00* | (2006.01) |

(52) U.S. Cl.
CPC ............ *B08B 3/02* (2013.01); *B05C 11/1039* (2013.01); *B05C 13/02* (2013.01); *B60S 3/042* (2013.01); *B05C 7/00* (2013.01); *B08B 2203/02* (2013.01); *B08B 2209/032* (2013.01); *B08B 2240/00* (2013.01)

(58) Field of Classification Search
CPC . B08B 3/02; B08B 2203/02; B08B 2209/032; B08B 2240/00; B05C 11/1039; B05C 13/02; B05C 7/00; B60S 3/042

USPC ........................................................ 134/123
See application file for complete search history.

(56) References Cited

FOREIGN PATENT DOCUMENTS

CN         204339501 U  *  5/2015

OTHER PUBLICATIONS

CN204401312U—Machine Translation (Year: 2015).*

* cited by examiner

*Primary Examiner* — Michael E Barr
*Assistant Examiner* — Tinsae B Ayalew
(74) *Attorney, Agent, or Firm* — Calfee, Halter & Griswold LLP

(57) ABSTRACT

Disclosed is a wheel cleaning device, comprising a frame, a waste water recovery tank, lifting guide posts, a feeding support plate, a lifting cylinder, a lifting platform, a support plate, an adjusting cylinder, a left slide plate, bolt hole cleaning spray pipes, clamping cylinders, a left clamping slide plate, a central cleaning spray pipe, clamping wheels, left spray pipes, left upper spray pipes, right upper spray pipes, right spray pipes, shafts, a right clamping slide plate, servo motors, clamping guide rails, clamping system support plates, a support, a right slide plate, a gear rack structure and a guide rail. The device can clean aluminum scraps remaining in bolt holes, flange drainage channels and weight reduction pits, meets the requirements of automatic production lines, and has the characteristics of compact structure, flexibility, practicability, stability, high efficiency and the like.

3 Claims, 3 Drawing Sheets

WHEEL CLEANING DEVICE

CROSS-REFERENCE TO RELATED APPLICATIONS

This application claims priority to Chinese Patent Application No. 2017105982946, filed on Jul. 21, 2017, which is hereby incorporated by reference in its entirety.

TECHNICAL FIELD

The present invention relates to the technical field of cleaning after machining of wheels, specifically to an automatic cleaning device after machining of a wheel.

BACKGROUND ART

After machining of a wheel, emulsion, oil stains and aluminum scraps remain on the surface, particularly, blocked aluminum scraps remain in bolt holes, flange drainage channels and flange weight reduction pits, and these blocked aluminum scraps may interfere with the positioning of wheel detection, so wheels must be cleaned before central holes, position accuracy, air tightness, balance and other items are automatically detected.

SUMMARY OF THE INVENTION

The present application provides a wheel cleaning device, which may clean aluminum scraps remaining in bolt holes, flange drainage channels and flange weight reduction pits.

In order to fulfill the above purpose, the present application adopts the following technical solution: A wheel cleaning device comprises a frame, a waste water recovery tank, lifting guide posts, a feeding support plate, a lifting cylinder, a lifting platform, a support plate, an adjusting cylinder, a left slide plate, bolt hole cleaning spray pipes, clamping cylinders, a left clamping slide plate, a central cleaning spray pipe, clamping wheels, left spray pipes, left upper spray pipes, right upper spray pipes, right spray pipes, shafts, a right clamping slide plate, servo motors, clamping guide rails, clamping system support plates, a support, a right slide plate, a gear rack structure and a guide rail.

The clamping system support plates are fixed on the frame, the clamping guide rails are fixed on the clamping system support plates, the left clamping slide plate and the right clamping slide plate are respectively mounted on the clamping guide rails, and the two clamping cylinders respectively drive the left clamping slide plate and the right clamping slide plate. Two servo motors are mounted on the left clamping slide plate, two servo motors are symmetrically mounted on the right clamping slide plate, the output ends of the servo motors are connected with the clamping wheels via the shafts and the servo motors drive the clamping wheels to rotate. When the clamping cylinders on the left and right sides move synchronously, a wheel can be positioned and clamped, and when the servo motors drive the clamping wheels to rotate, the wheel can be driven to rotate.

The feeding support plate is fixed on the frame and provided with four drain holes configured to drain flushing waste water to the waste water recovery tank, the lifting cylinder is fixed on the feeding support plate, the output end of the lifting cylinder is connected with the lifting platform, and the lifting cylinder controls ascending and descending of the lifting platform under the guiding effect of the four lifting guide posts.

The support plate, the guide rail and the support are all fixed on the lifting platform, the adjusting cylinder is fixed on the support plate, the output end of the adjusting cylinder is connected with the left slide plate, the left slide plate and the right slide plate are respectively mounted on the guide rail and connected via the gear rack structure, and the two bolt hole cleaning spray pipes are symmetrically mounted on the left slide plate and the right slide plate and spray high pressure water into bolt holes vertically upward; the central cleaning spray pipe is mounted on the support and located below the center of the wheel, the high pressure water outlet of the central cleaning spray pipe is T-shaped for spraying water right ahead and right back respectively to avoid interfering with the high pressure water sprayed from the bolt hole cleaning spray pipes on the left and right sides, and the central cleaning spray pipe is used for cleaning flange drainage channels and weight reduction pits and sprays high pressure water from the central hole to the outer side of a flange. Based on the current situation, the present application provides a wheel cleaning device, which may be used for an automatic production line and may clean the wheel in all directions and clean the aluminum scraps remaining in bolt holes, flange drainage channels and flange weight reduction pits.

When the adjusting cylinder drives the left slide plate to move, the right slide plate moves synchronously with the left slide plate under the action of the gear rack structure, so that the distance between the two bolt hole cleaning spray pipes is adjusted, and the device can clean wheels having different pitch diameters.

The upper part of the frame is herringbone, the left upper spray pipes and the right upper spray pipes are symmetrically mounted at the upper part of the frame and used for cleaning the front side of the wheel, and the left spray pipes and the right spray pipes are symmetrically mounted on the frame and used for cleaning the outer rim of the wheel.

The working process of the device is as follows: according to the pitch diameter of a wheel on an assembly line, the distance between the two bolt hole cleaning spray pipes is adjusted; when the wheel arrives at the area of the device via a roller bed, the two clamping cylinders are synchronously started to clamp the wheel; then the servo motors are started, so that the wheel rotates; the lifting cylinder is started to drive the lifting platform to ascend, and when the central cleaning spray pipe enters the central hole, the lifting platform stops ascending; and the left spray pipes, the right spray pipes, the left upper spray pipes, the right upper spray pipes, the bolt hole cleaning spray pipes and the central cleaning spray pipe simultaneously spray high pressure water. The central cleaning spray pipe sprays high pressure water from the central hole to the outer side of the flange, so that flange drainage channels and weight reduction pits can be effectively cleaned; and the high pressure water sprayed from the central cleaning spray pipe flows through the flange and then arrives at the inner rim, so that the inner rim can also be effectively cleaned. Since the wheel rotates, all bolt holes can be cleaned via the bolt hole cleaning spray pipes, all the flange drainage channels and weight reduction pits can be cleaned via the central cleaning spray pipe, and aluminum scraps blocked therein are effectively removed. After cleaning, the clamping wheels loosen the wheel, the lifting platform is reset, the roller bed carries the wheel away, and next wheel is prepared for cleaning.

The device of the present invention may clean aluminum scraps remaining in bolt holes, flange drainage channels and weight reduction pits, meets the requirements of automatic production lines, and has the characteristics of compact structure, flexibility, practicability, stability, high efficiency and the like.

Figure 1:
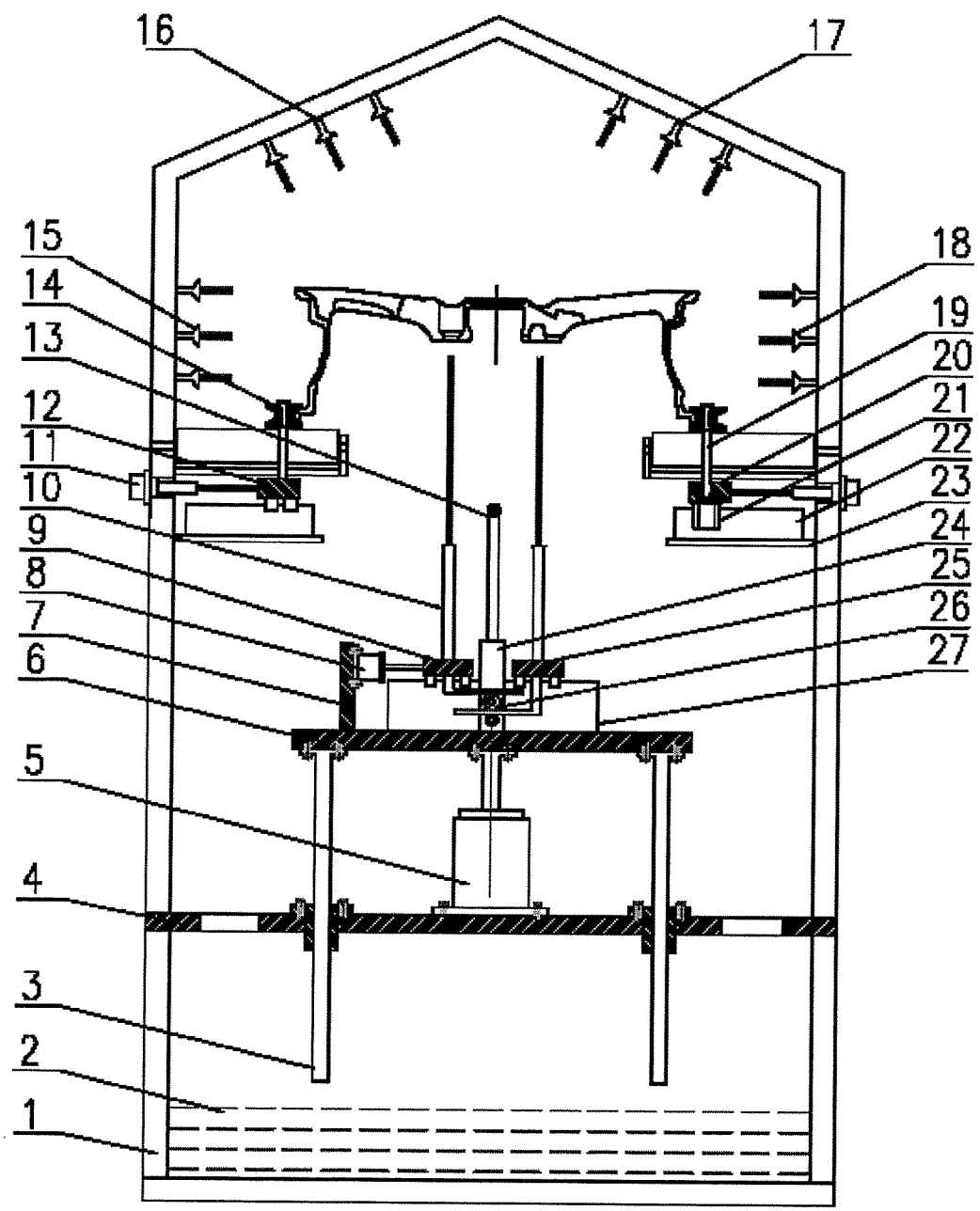
FIG. 1 is a front view of a wheel cleaning device of the present application.
Figure 2:
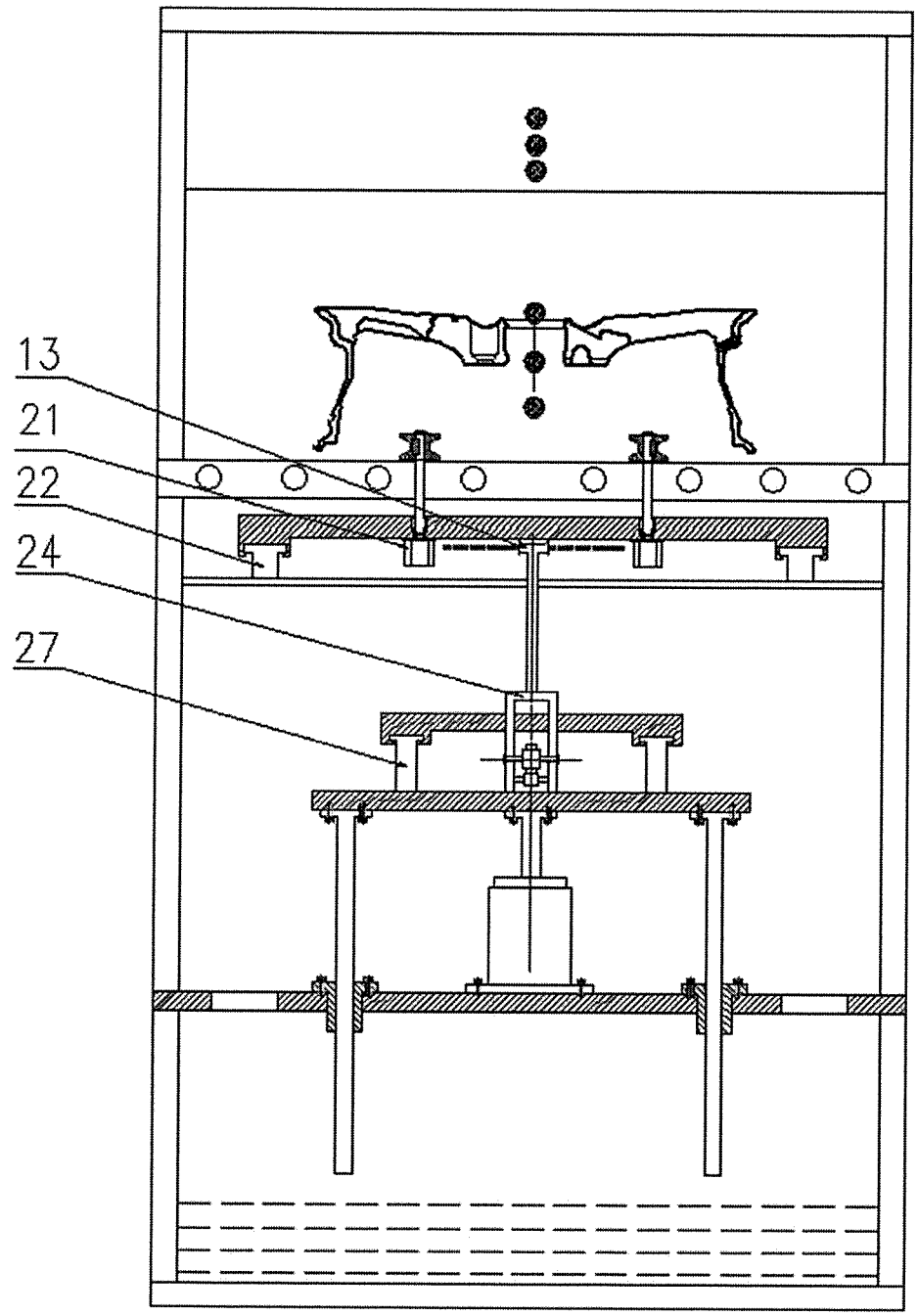
FIG. 2 is a left view of the wheel cleaning device of the present application.
Figure 3:
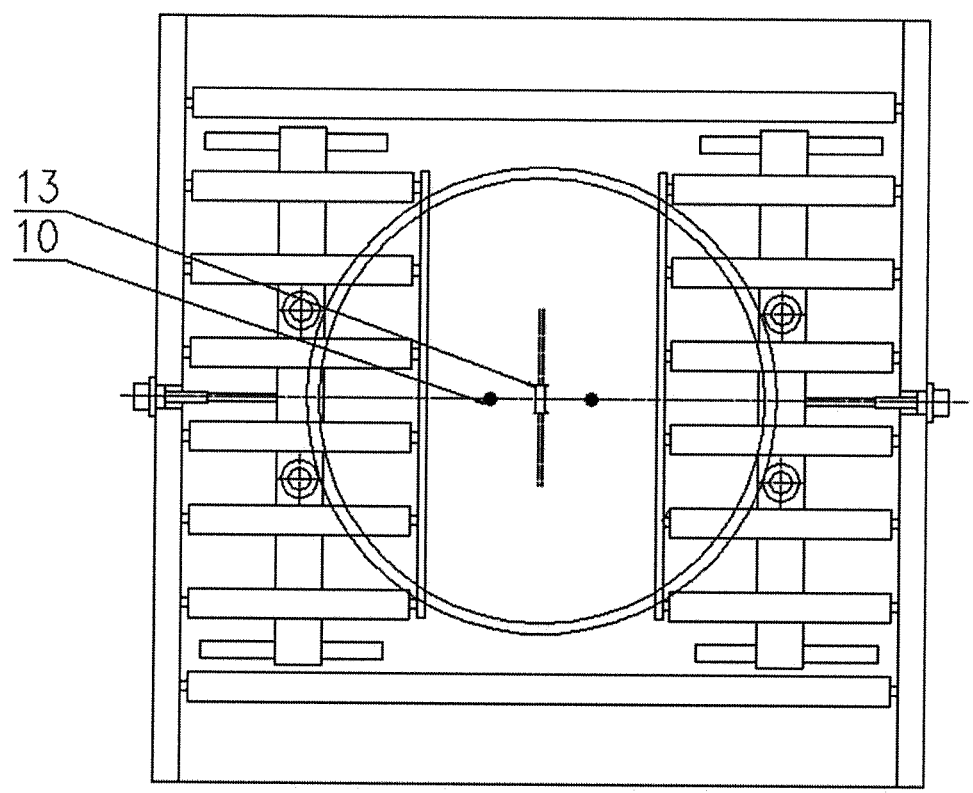
FIG. 3 is a top view of the wheel cleaning device of the present application.

In which, 1—frame, 2—waste water recovery tank, 3—lifting guide post, 4—feeding support plate, 5—lifting cylinder, 6—lifting platform, 7—support plate, 8—adjusting cylinder, 9—left slide plate, 10—bolt hole cleaning spray pipe, 11—clamping cylinder, 12—left clamping slide plate, 13—central cleaning spray pipe, 14—clamping wheel, 15—left spray pipe, 16—left upper spray pipe, 17—right upper spray pipe, 18—right spray pipe, 19—shaft, 20—right clamping slide plate, 21—servo motor, 22—clamping guide rail, 23—clamping system support plate, 24—support, 25—right slide plate, 26—gear rack structure, 27—guide rail.

DETAILED DESCRIPTION OF THE INVENTION

Details and working conditions of a specific device provided by the present application will be given below in combination with the accompanying drawings.

A wheel cleaning device comprises a frame 1, a waste water recovery tank 2, lifting guide posts 3, a feeding support plate 4, a lifting cylinder 5, a lifting platform 6, a support plate 7, an adjusting cylinder 8, a left slide plate 9, bolt hole cleaning spray pipes 10, clamping cylinders 11, a left clamping slide plate 12, a central cleaning spray pipe 13, clamping wheels 14, left spray pipes 15, left upper spray pipes 16, right upper spray pipes 17, right spray pipes 18, shafts 19, a right clamping slide plate 20, servo motors 21, clamping guide rails 22, clamping system support plates 23, a support 24, a right slide plate 25, a gear rack structure 26 and a guide rail 27.

The clamping system support plates 23 are fixed on the frame 1, the clamping guide rails 22 are fixed on the clamping system support plates 23, the left clamping slide plate 12 and the right clamping slide plate 20 are respectively mounted on the clamping guide rails 22, and the two clamping cylinders 11 respectively drive the left clamping slide plate 12 and the right clamping slide plate 20. Two servo motors 21 are mounted on the left clamping slide plate 12, two servo motors 21 are symmetrically mounted on the right clamping slide plate 20, the output ends of the servo motors 21 are connected with the clamping wheels 14 via the shafts 19 and the servo motors 21 drive the clamping wheels 14 to rotate. When the clamping cylinders 11 on the left and right sides move synchronously, a wheel can be positioned and clamped, and when the servo motors 21 drive the clamping wheels 14 to rotate, the wheel can be driven to rotate.

The feeding support plate 4 is fixed on the frame 1 and provided with four drain holes configured to drain flushing waste water to the waste water recovery tank 2, the lifting cylinder 5 is fixed on the feeding support plate 4, the output end of the lifting cylinder 5 is connected with the lifting platform 6, and the lifting cylinder 5 controls ascending and descending of the lifting platform 6 under the guiding effect of the four lifting guide posts 3.

The support plate 7, the guide rail 27 and the support 24 are all fixed on the lifting platform 6, the adjusting cylinder 8 is fixed on the support plate 7, the output end of the adjusting cylinder 8 is connected with the left slide plate 9, the left slide plate 9 and the right slide plate 25 are respectively mounted on the guide rail 27 and connected via the gear rack structure 26, and the two bolt hole cleaning spray pipes 10 are symmetrically mounted on the left slide plate 9 and the right slide plate 25 and spray high pressure water into bolt holes vertically upward; the central cleaning spray pipe 13 is mounted on the support 24 and located below the center of the wheel, the high pressure water outlet of the central cleaning spray pipe 13 is T-shaped for spraying water right ahead and right back respectively to avoid interfering with the high pressure water sprayed from the bolt hole cleaning spray pipes 10 on the left and right sides, and the central cleaning spray pipe 13 is used for cleaning flange drainage channels and weight reduction pits and sprays high pressure water from the central hole to the outer side of a flange.

When the adjusting cylinder 8 drives the left slide plate 9 to move, the right slide plate 25 moves synchronously with the left slide plate 9 under the action of the gear rack structure 26, so that the distance between the two bolt hole cleaning spray pipes 10 is adjusted, and the device can clean wheels having different pitch diameters.

The upper part of the frame 1 is herringbone, the left upper spray pipes 16 and the right upper spray pipes 17 are symmetrically mounted at the upper part of the frame 1 and used for cleaning the front side of the wheel, and the left spray pipes 15 and the right spray pipes 18 are symmetrically mounted on the frame 1 and used for cleaning the outer rim of the wheel.

The working process of the device is as follows: according to the pitch diameter of a wheel on an assembly line, the distance between the two bolt hole cleaning spray pipes 10 is adjusted; when the wheel arrives at the area of the device via a roller bed, the two clamping cylinders 11 are synchronously started to clamp the wheel; then the servo motors 21 are started, so that the wheel rotates; the lifting cylinder 5 is started to drive the lifting platform 6 to ascend, and when the central cleaning spray pipe 13 enters the central hole, the lifting platform 6 stops ascending; and the left spray pipes 15, the right spray pipes 18, the left upper spray pipes 16, the right upper spray pipes 17, the bolt hole cleaning spray pipes 10 and the central cleaning spray pipe 13 simultaneously spray high pressure water. The central cleaning spray pipe 13 sprays high pressure water from the central hole to the outer side of the flange, so that flange drainage channels and weight reduction pits can be effectively cleaned; and the high pressure water sprayed from the central cleaning spray pipe 13 flows through the flange and then arrives at the inner rim, so that the inner rim can also be effectively cleaned. Since the wheel rotates, all bolt holes can be cleaned via the bolt hole cleaning spray pipes 10, all the flange drainage channels and weight reduction pits can be cleaned via the central cleaning spray pipe 13, and aluminum scraps blocked therein are effectively removed. After cleaning, the clamping wheels 14 loosen the wheel, the lifting platform 6 is reset, the roller bed carries the wheel away, and next wheel is prepared for cleaning.

The device of the present invention can clean aluminum scraps remaining in bolt holes, flange drainage channels and weight reduction pits, meets the requirements of automatic production lines, and has the characteristics of compact structure, flexibility, practicability, stability, high efficiency and the like The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wheel cleaning device, comprising a frame, a waste water recovery tank, lifting guide posts, a feeding support plate, a lifting cylinder, a lifting platform, a support plate, an adjusting cylinder, a left slide plate, bolt hole cleaning spray pipes, clamping cylinders, a left clamping slide plate, a central cleaning spray pipe, clamping wheels, left spray pipes, left upper spray pipes, right upper spray pipes, right spray pipes, shafts, a right clamping slide plate, servo motors, clamping guide rails, clamping system support plates, a support, a right slide plate, a gear rack structure and a guide rail, wherein the support plate, the guide rail and the support are all fixed on the lifting platform, the adjusting cylinder is fixed on the support plate, an output end of the adjusting cylinder is connected with the left slide plate, the left slide plate and the right slide plate are respectively mounted on the guide rail and connected via the gear rack structure, and the two bolt hole cleaning spray pipes are symmetrically mounted on the left and right slide plates and spray high pressure water into bolt holes vertically upward; the central cleaning spray pipe is mounted on the support and located below the center of the wheel, the high pressure water outlet of the central cleaning spray pipe is T-shaped for spraying water right ahead and right back respectively to avoid interfering with the high pressure water sprayed from the bolt hole cleaning spray pipes on the left and right sides, and the central cleaning spray pipe is used for cleaning flange drainage channels and weight reduction pits and sprays high pressure water from the central hole to the outer side of a flange.

2. The wheel cleaning device of claim 1, wherein when the adjusting cylinder drives the left slide plate to move, the right slide plate moves synchronously with the left slide plate under the action of the gear rack structure, so that the distance between the two bolt hole cleaning spray pipes is adjusted, and the device is configured to clean wheels having different pitch diameters.

3. The wheel cleaning device of claim 1, wherein the upper part of the frame is herringbone, the left upper spray pipes and the right upper spray pipes are symmetrically mounted at the upper part of the frame and used for cleaning the front side of the wheel, and the left spray pipes and the right spray pipes are symmetrically mounted on the frame and used for cleaning the outer rim of the wheel.

* * * * *